US 8,660,062 B2

United States Patent
Chin et al.

(10) Patent No.: US 8,660,062 B2
(45) Date of Patent: Feb. 25, 2014

(54) METHODS AND APPARATUS FOR QUALITY OF SERVICE-BASED UPLINK POLLING SCHEMES

(75) Inventors: Tom Chin, San Diego, CA (US); Kuo-Chun Lee, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 836 days.

(21) Appl. No.: 12/127,362

(22) Filed: May 27, 2008

(65) Prior Publication Data
US 2009/0196219 A1 Aug. 6, 2009

Related U.S. Application Data

(60) Provisional application No. 61/025,674, filed on Feb. 1, 2008.

(51) Int. Cl.
*H04W 4/00* (2009.01)

(52) U.S. Cl.
USPC .......................................... 370/328

(58) Field of Classification Search
USPC ........................... 370/328, 329, 330
See application file for complete search history.

(56) References Cited

U.S. PATENT DOCUMENTS

| | | | | |
|---|---|---|---|---|
| 6,480,473 B1 * | 11/2002 | Chambers et al. | ............ | 370/253 |
| 6,956,834 B2 * | 10/2005 | Stanwood et al. | ............ | 370/329 |
| 7,242,694 B2 * | 7/2007 | Beser | ............................. | 370/449 |
| 7,869,412 B2 * | 1/2011 | Meier | ............................ | 370/338 |
| 2004/0213197 A1 | 10/2004 | Zimmerman et al. | | |
| 2004/0264428 A1 | 12/2004 | Choi et al. | | |
| 2007/0025297 A1 | 2/2007 | Lee et al. | | |
| 2007/0058605 A1 * | 3/2007 | Meylan et al. | ............... | 370/346 |

FOREIGN PATENT DOCUMENTS

| | | |
|---|---|---|
| CN | 101035139 A | 9/2007 |
| JP | 2001044914 A | 2/2001 |
| RU | 2006113928 A | 11/2007 |
| WO | WO2005032079 | 4/2005 |

OTHER PUBLICATIONS

Standards: IEEE Part 16: Air Interface for Broadband Wireless Access Systems, P802.16Rev2/D8 Section 6.3.6.3 Polling.
International Search Report—PCT/US09/032718, International Search Authority, European Patent Office, Dec. 10, 2009.
Written Opinion—PCT/US2009/032718, International Search Authority, European Patent Office, Dec. 10, 2009.
Taiwan Search Report—TW098103297—TIPO—Oct. 24, 2012.

* cited by examiner

*Primary Examiner* — Mark Rinehart
*Assistant Examiner* — Mohammad Anwar
(74) *Attorney, Agent, or Firm* — Charles Chesney

(57) ABSTRACT

A method for allocating polling bandwidth may include generating polling tokens corresponding to connections maintained by a base station. The polling tokens may be generated at configurable time intervals. The method may also include assigning priorities to the polling tokens. The priority of a polling token may depend on a scheduling type of a corresponding connection. The method may also include allocating polling bandwidth to the connections that correspond to the highest priority polling tokens when uplink bandwidth is available to allocate for polling.

36 Claims, 12 Drawing Sheets

METHODS AND APPARATUS FOR QUALITY OF SERVICE-BASED UPLINK POLLING SCHEMES

RELATED APPLICATIONS

This application claims the benefit of priority from U.S. Provisional Patent Application Ser. No. 61/025,674, filed Feb. 1, 2008 and entitled "QoS Based Polling Schemes in WiMAX Systems," which is fully incorporated herein by reference.

TECHNICAL FIELD

The present disclosure relates generally to wireless communication technology. More specifically, the present disclosure relates to methods and apparatus for quality of service-based uplink polling schemes.

BACKGROUND

As used herein, the term "subscriber station" refers to an electronic device that may be used for voice and/or data communication over a wireless communication network. Examples of subscriber stations include cellular phones, personal digital assistants (PDAs), handheld devices, wireless modems, laptop computers, personal computers, etc. A subscriber station may alternatively be referred to as a mobile station, an access terminal, a remote station, a user terminal, a terminal, a subscriber unit, user equipment, etc.

A wireless communication network may provide communication for a number of subscriber stations, each of which may be serviced by a base station. A base station may alternatively be referred to as an access point, a Node B, or some other terminology.

A subscriber station may communicate with one or more base stations via transmissions on the uplink and the downlink. The uplink (or reverse link) refers to the communication link from the subscriber station to the base station, and the downlink (or forward link) refers to the communication link from the base station to the subscriber station.

The resources of a wireless communication network (e.g., bandwidth and transmit power) may be shared among multiple subscriber stations. A variety of multiple access techniques are known, including code division multiple access (CDMA), time division multiple access (TDMA), frequency division multiple access (FDMA), and orthogonal frequency division multiple access (OFDMA).

SUMMARY

Figure 1:
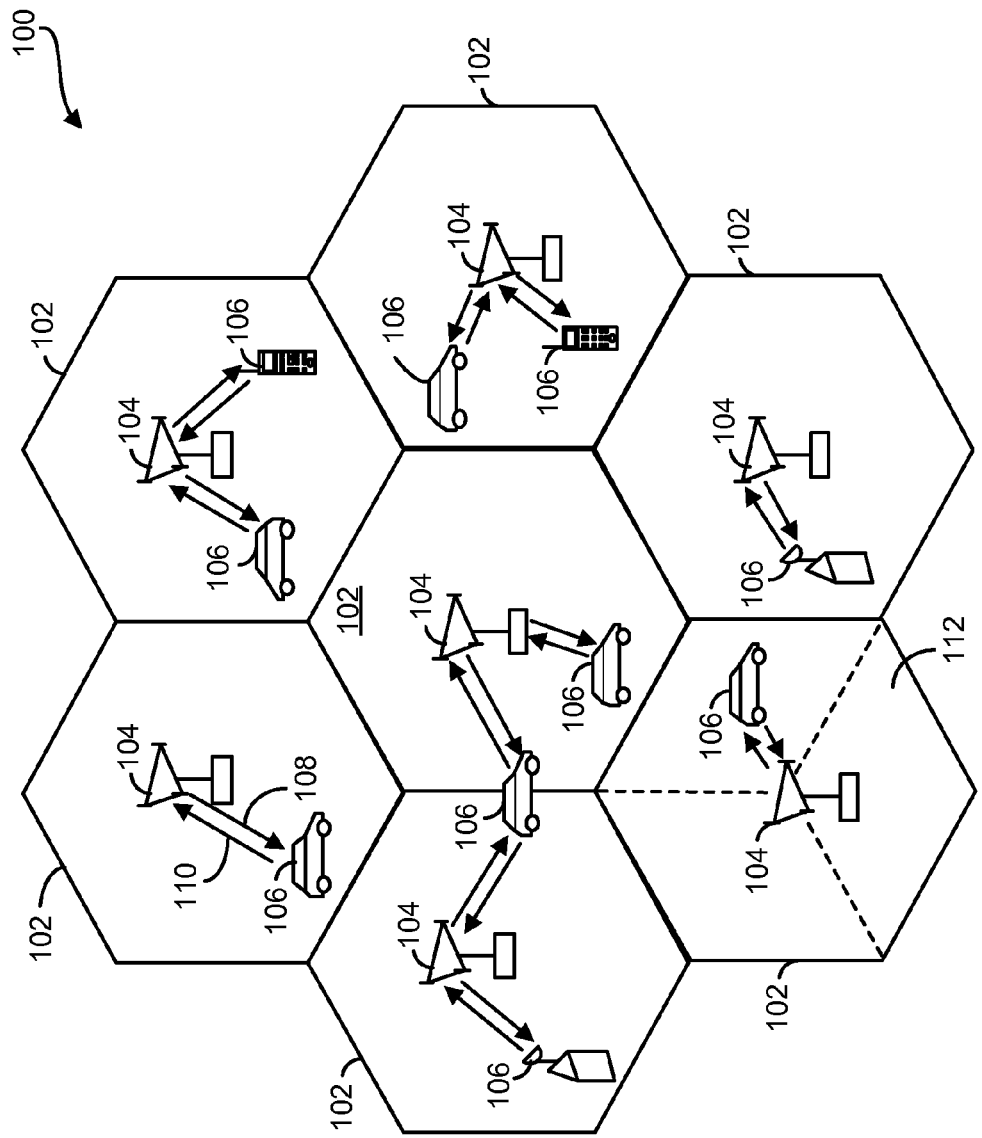
FIG. 1 illustrates a wireless communication network.

A base station that is configured for allocating polling bandwidth based on quality of service requirements is disclosed. The base station comprises a processor and memory in electronic communication with the processor. Instructions are stored in the memory. The instructions may be executable to generate polling tokens corresponding to connections maintained by the base station. The polling tokens may be generated at configurable time intervals. The instructions may also be executable to assign priorities to the polling tokens. The priority of a polling token may depend on a scheduling type of a corresponding connection. The instructions may also be executable to allocate polling bandwidth to the connections that correspond to the highest priority polling tokens when uplink bandwidth is available to allocate for polling.

A subscriber station that is configured for selecting connections for which bandwidth requests are transmitted based on quality of service requirements is also disclosed. The subscriber station comprises a processor and memory in electronic communication with the processor. Instructions are stored in the memory. The instructions may be executable to receive a polling bandwidth allocation from a base station. The instructions may also be executable to select one or more connections for which one or more bandwidth requests are to be transmitted to the base station. The instructions may also be executable to transmit the one or more bandwidth requests to the base station for the selected connections.

A method for allocating polling bandwidth based on quality of service requirements is also disclosed. The method may be implemented by a base station. The method may comprise generating polling tokens corresponding to connections maintained by the base station. The polling tokens may be generated at configurable time intervals. The method may also comprise assigning priorities to the polling tokens. The priority of a polling token may depend on a scheduling type of a corresponding connection. The method may also comprise allocating polling bandwidth to the connections that correspond to the highest priority polling tokens when uplink bandwidth is available to allocate for polling.

A method for selecting connections for which bandwidth requests are transmitted based on quality of service requirements is also disclosed. The method may be implemented by a subscriber station. The method may comprise receiving a polling bandwidth allocation from a base station. The method may also comprise selecting one or more connections for which one or more bandwidth requests are to be transmitted to the base station. The method may also comprise transmitting the one or more bandwidth requests to the base station for the selected connections.

A base station that is configured for allocating polling bandwidth based on quality of service requirements is also disclosed. The base station may comprise means for generating polling tokens corresponding to connections maintained by the base station. The polling tokens may be generated at configurable time intervals. The base station may also comprise means for assigning priorities to the polling tokens. The priority of a polling token may depend on a scheduling type of a corresponding connection. The base station may also comprise means for allocating polling bandwidth to the connections that correspond to the highest priority polling tokens when uplink bandwidth is available to allocate for polling.

A subscriber station that is configured for selecting connections for which bandwidth requests are transmitted based on quality of service requirements is also disclosed. The subscriber station may comprise means for receiving a polling bandwidth allocation from a base station. The subscriber station may also comprise means for selecting one or more connections for which one or more bandwidth requests are to be transmitted to the base station. The subscriber station may also comprise means for transmitting the one or more bandwidth requests to the base station for the selected connections.

A computer-program product for allocating polling bandwidth based on quality of service requirements is also disclosed. The computer-program product comprises a computer readable medium having instructions thereon. The instructions may comprise code for generating polling tokens corresponding to connections maintained by the base station. The polling tokens may be generated at configurable time intervals. The instructions may also comprise code for assigning priorities to the polling tokens. The priority of a polling token may depend on a scheduling type of a corresponding connection. The instructions may also comprise code for allocating polling bandwidth to the connections that correspond to the highest priority polling tokens when uplink bandwidth is available to allocate for polling.

A computer-program product for selecting connections for which bandwidth requests are transmitted based on quality of service requirements is also disclosed. The computer-program product comprises a computer readable medium having instructions thereon. The instructions may comprise code for receiving a polling bandwidth allocation from a base station. The instructions may also comprise code for selecting one or more connections for which one or more bandwidth requests are to be transmitted to the base station. The instructions may also comprise code for transmitting the one or more bandwidth requests to the base station for the selected connections.

DETAILED DESCRIPTION

The methods and apparatus of the present disclosure may be utilized in a broadband wireless communication network. The term "broadband wireless" refers to technology that provides wireless, voice, Internet, and/or data network access over a given area.

The Institute of Electronic and Electrical Engineers (IEEE) 802.16 Working Group on Broadband Wireless Access Standards aims to prepare formal specifications for the global deployment of broadband Wireless Metropolitan Area Networks. Although the 802.16 family of standards is officially called WirelessMAN, it has been called "WiMAX" (which stands for the "Worldwide Interoperability for Microwave Access") by an industry group called the WiMAX Forum. Thus, the term "WiMAX" refers to a standards-based broadband wireless technology that provides high-throughput broadband connections over long distances.

Some of the examples described herein are relevant to wireless communication networks that are configured in accordance with WiMAX standards. However, these examples should not be interpreted as limiting the scope of the present disclosure.

WiMAX is based on OFDM (orthogonal frequency division multiplexing) and OFDMA (orthogonal frequency division multiple access) technology. OFDM is a digital multi-carrier modulation technique that has recently found wide adoption in a variety of high-data-rate communication networks. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

In a WiMAX network, a "slot" is the smallest unit to allocate bandwidth to users. A slot is a subchannel (i.e., a group of subcarriers) over a slot duration (i.e., a certain number of symbols). A "burst" is an allocation of one or more continuous slots with the same modulation and coding scheme.

In a WiMAX network, a "frame" is a time interval of constant length. For time division duplex (TDD) operation, each frame is divided into downlink (DL) and uplink (UL) sub-frames. Control information, in the format of MAP messages, is transmitted at the beginning of each frame. The MAP messages define the DL and the UL allocation. Several different types of MAP messages are defined. These include the DL-MAP message and the UL-MAP message.

Support for quality of service (QoS) is an important part of a WiMAX network. QoS control is achieved by using a connection-oriented architecture, where all downlink and uplink connections are controlled by the serving base station. Before any data transmission happens, the base station and the subscriber station establish a unidirectional logical link, called a connection, between the two medium access control (MAC) layer peers. Each connection is identified by a connection identifier (CID), which serves as a temporary address for data transmissions over the particular link.

WiMAX also defines a concept of a service flow. A service flow is a unidirectional flow of packets with a particular set of QoS parameters and is identified by a service flow identifier (SFID). The QoS parameters could include traffic priority, maximum sustained traffic rate, maximum burst rate, minimum reserved traffic rate, scheduling type, maximum delay, tolerated jitter, unsolicited polling interval, service data unit type and size, bandwidth request mechanism to be used, transmission packet data unit (PDU) formation rules, and so on.

To support a wide variety of applications, WiMAX defines five scheduling services that should be supported by the base station MAC scheduler for data transport over a connection: unsolicited grant service (UGS), real-time polling service (rtPS), non-real-time polling service (nrtPS), best-effort service (BE), and extended real-time polling service (ertPS). The unsolicited grant service is designed to support fixed-size data packets at a constant bit rate. The real-time polling service is designed to support real-time service flows (e.g., streaming video). The non-real-time polling service is designed to support delay-tolerant data streams that require variable-size data grants at a minimum guaranteed rate (e.g., FTP). The best-effort service is designed to support data streams that do not require a minimum service-level guarantee (e.g., web browsing). The extended real-time polling service is designed to support real-time applications that have variable data rates but require guaranteed data rate and delay (e.g., voice over IP with silence suppression).

When a subscriber station indicates to the base station that it should be allocated uplink bandwidth, this may be referred to as a "bandwidth request." "Polling" is a process by which a base station allocates specific bandwidth (i.e., one or more uplink slots) for the subscriber station to send bandwidth requests. The bandwidth that is used by subscriber stations for sending bandwidth requests may be referred to herein as "polling bandwidth." One aspect of the present disclosure relates to techniques for the base station to efficiently allocate the polling bandwidth. More specifically, one aspect of the present disclosure relates to ways in which the base station may take quality of service requirements into consideration when allocating the polling bandwidth.

Under some circumstances, a subscriber station may have multiple active connections, each required to send the bandwidth request individually. The amount of polling bandwidth that is allocated to the subscriber station may not be sufficient to allow bandwidth requests to be transmitted for all active connections. Another aspect of the present disclosure relates to how the subscriber station selects the connections for which the bandwidth requests are transmitted.

FIG. 1 illustrates a wireless communication network 100. The wireless communication network 100 may be a broadband wireless communication network 100. The wireless communication network 100 provides communication for a number of cells 102, each of which is serviced by a base station 104. A base station 104 may be a fixed station that communicates with subscriber stations 106. The base station 104 may alternatively be referred to as an access point, a Node B, or some other terminology.

FIG. 1 shows various subscriber stations 106 dispersed throughout the network 100. The subscriber stations 106 may be fixed (i.e., stationary) or mobile. The subscriber stations 106 may alternatively be referred to as mobile stations, access terminals, remote stations, user terminals, terminals, subscriber units, user equipment, etc. The subscriber stations 106 may be wireless devices, such as cellular phones, personal digital assistants (PDAs), handheld devices, wireless modems, laptop computers, personal computers, etc.

A variety of algorithms and methods may be used for transmissions in the wireless communication network 100 between the base stations 104 and the subscriber stations 106. For example, signals may be sent and received between the base stations 104 and the subscriber stations 106 in accordance with orthogonal frequency division multiple access (OFDMA), code division multiple access (CDMA), time division multiple access (TDMA), frequency division multiple access (FDMA), etc.

A communication link that facilitates transmission from a base station 104 to a subscriber station 106 may be referred to as a downlink 108, and a communication link that facilitates transmission from a subscriber station 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within the wireless communication network 100 may utilize antennas that concentrate the flow of power within a particular sector 112 of the cell 102.

Figure 2:
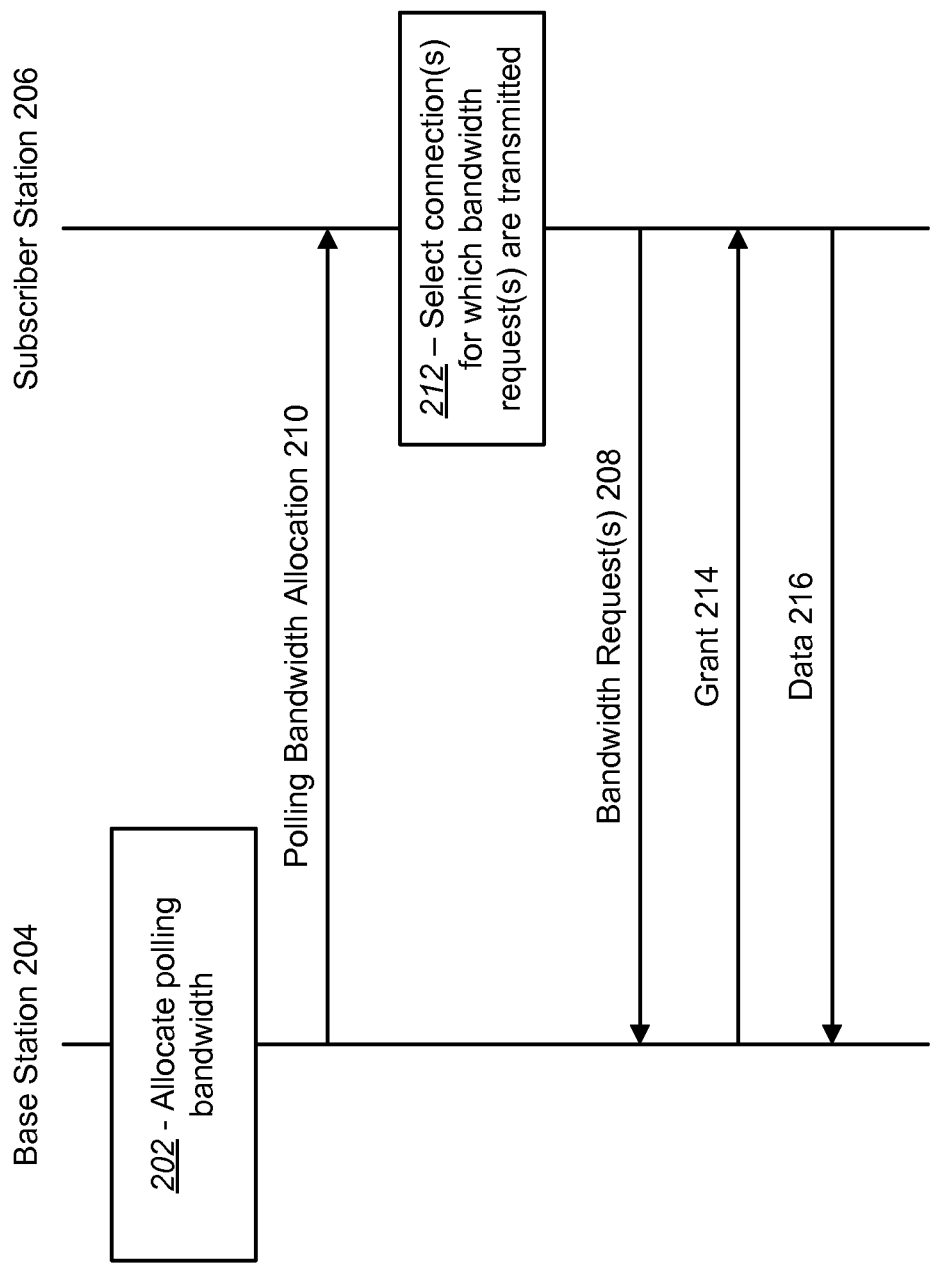
FIG. 2 illustrates various functions that may be performed by a base station and a subscriber station in accordance with the present disclosure.

FIG. 2 illustrates various functions that may be performed by a base station 204 and a subscriber station 206 in accordance with the present disclosure. FIG. 2 also illustrates communication that may occur between the base station 204 and the subscriber station 206 in accordance with the present disclosure.

The base station 204 may allocate 202 polling bandwidth to a subscriber station 206. The polling bandwidth is the bandwidth that is used by the subscriber station 206 for sending bandwidth requests 208 to the base station 204. The base station 204 may communicate the polling bandwidth allocation 210 to the subscriber station 206. For example, the base station 204 may indicate the basic connection identifier (CID) of the subscriber station 206 in the UL-MAP.

The subscriber station 206 may select 212 one or more connections for which bandwidth requests 208 are transmitted, so that the polling bandwidth allocation 210 is utilized but not exceeded. The subscriber station 206 may then transmit one or more bandwidth requests 208 to the base station 204.

Based on the bandwidth requests 208 that are received, the base station 204 may provide one or more grants 214 of uplink bandwidth to the subscriber station 206. The subscriber station 206 may transmit data 216 to the base station 204 in accordance with the grants 214 that are received.

Figure 3:
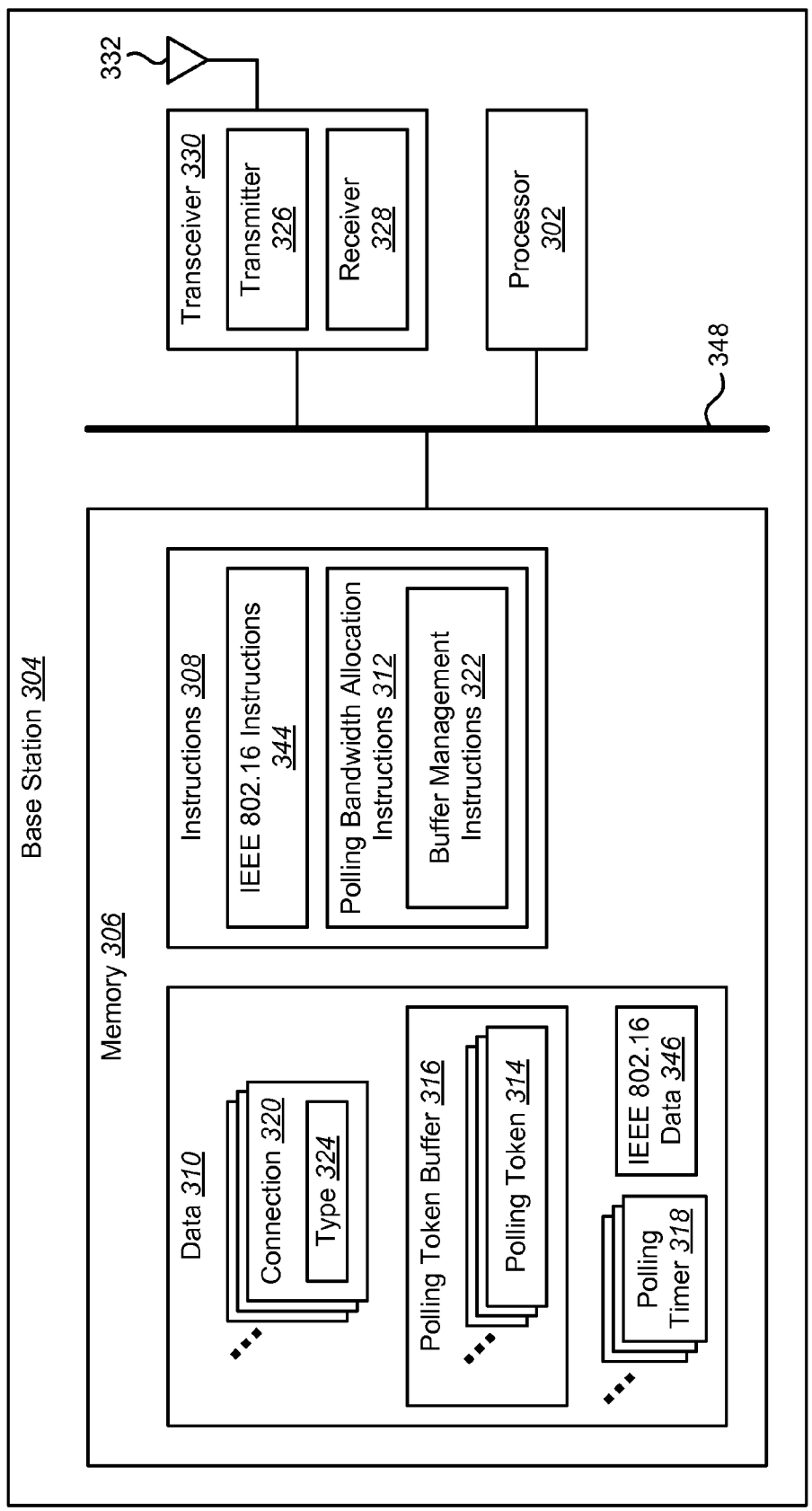
FIG. 3 illustrates a base station that is configured to allocate polling bandwidth based on quality of service requirements.

FIG. 3 illustrates a base station 304. The base station 304 may be configured to allocate polling bandwidth based on quality of service requirements.

The base station 304 includes a processor 302. The processor 302 may be a general purpose single- or multi-chip microprocessor (e.g., an ARM), a special purpose microprocessor (e.g., a digital signal processor (DSP)), a microcontroller, a programmable gate array, etc. The processor 302 may be referred to as a central processing unit (CPU). Although just a single processor 302 is shown in the base station 304 of FIG. 3, in an alternative configuration, a combination of processors 302 (e.g., an ARM and DSP) could be used.

The base station 304 also includes a memory 306. The memory 306 may be any electronic component capable of storing electronic information. The memory 306 may be embodied as random access memory (RAM), read only memory (ROM), magnetic disk storage media, optical storage media, flash memory devices in RAM, on-board memory included with the processor 302, EPROM memory, EEPROM memory, registers, and so forth, including combinations thereof.

Instructions 308 and data 310 may be stored in the memory 306. The instructions 308 may be executable by the processor 302 to implement various functions, which will be described below. Executing the instructions 308 may involve the use of the data 310 that is stored in the memory 306.

The base station 304 may also include a transmitter 326 and a receiver 328 to allow transmission and reception of data between the base station 304 and subscriber stations 106. The transmitter 326 and receiver 328 may be collectively referred to as a transceiver 330. An antenna 332 may be electrically coupled to the transceiver 330. The base station 304 may also include (not shown) multiple transmitters, multiple receivers, multiple transceivers and/or multiple antenna.

The various components of the base station 304 may be coupled together by one or more buses, which may include a power bus, a control signal bus, a status signal bus, a data bus, etc. For the sake of clarity, the various buses are illustrated in FIG. 3 as a bus system 348.

The base station 304 may be configured to communicate via a wireless communication network that supports the IEEE 802.16 standard (i.e., WiMAX). The memory 306 may include instructions 344 and data 346 that facilitate communication in accordance with the IEEE 802.16 standard.

The data 310 in the memory 306 may include information about the active connections 320 that are currently maintained by the base station 304. The information that is maintained about the connections 320 may include the scheduling types 324 of the various connections 320. The following scheduling types 324 for uplink transport connections 320 are defined in the IEEE 802.16 standard: UGS (unsolicited grant service), ertPS (extended real-time polling service), rtPS (real-time polling service), nrtPS (non-real-time polling service), and BE (best effort).

The data 310 in the memory 306 may also include polling tokens 314, which may be stored in a polling token buffer 316. There may be a separate polling token buffer 316 for each sector 112 for which the base station 304 is responsible. The data 310 may also include polling timers 318. There may be a separate polling timer 318 for each connection 320 that is maintained by the base station 304. The polling tokens 314 and the polling timers 318 will be described in greater detail below.

The instructions 308 in the memory 306 may also include instructions 312 for allocating polling bandwidth. As indicated above, the polling bandwidth is the bandwidth that is used by subscriber stations 106 for sending bandwidth requests 208. The polling bandwidth allocation instructions 312 may include instructions 322 for managing the polling token buffer 316.

Figure 4:
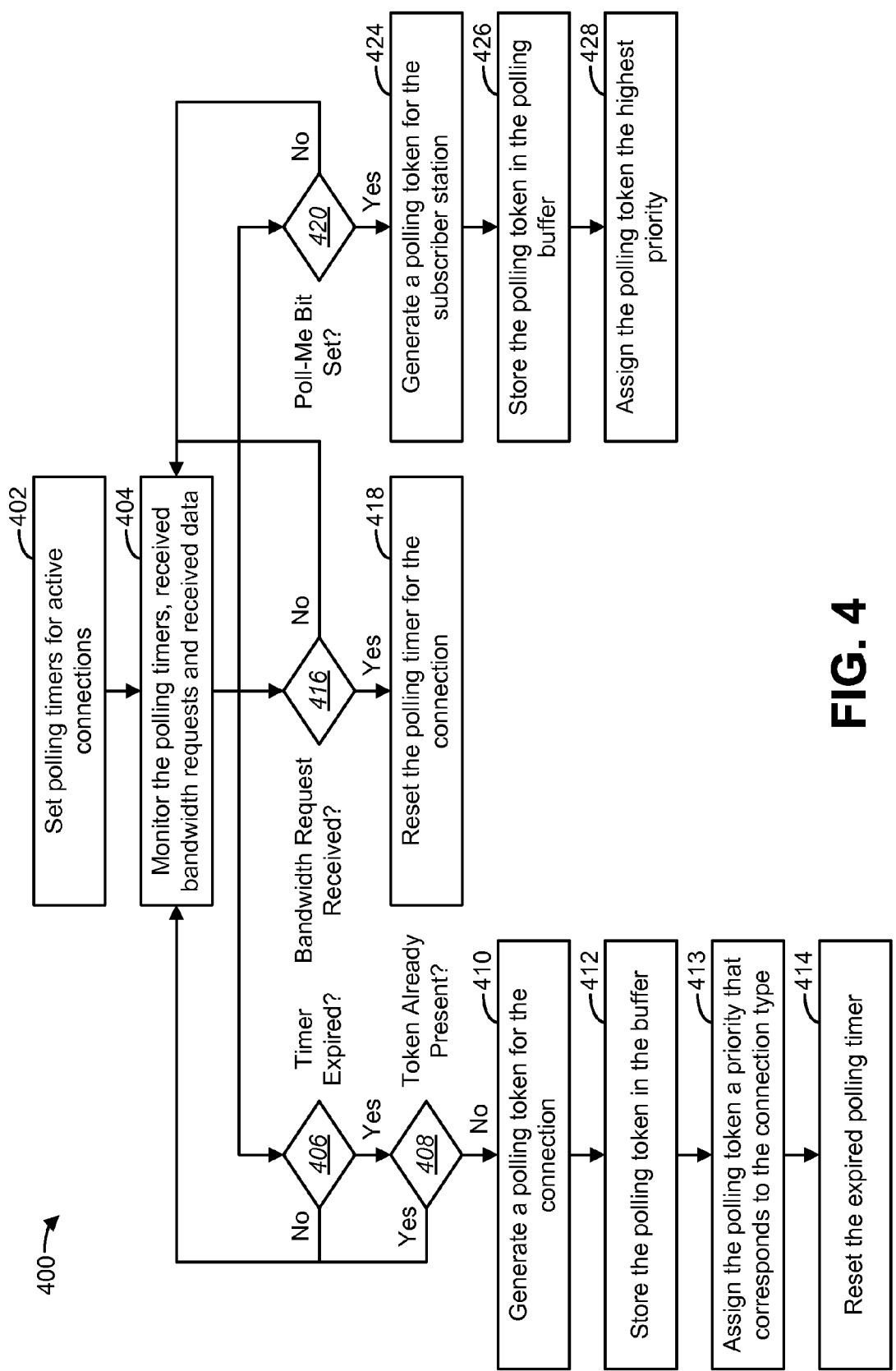
FIG. 4 illustrates a method for managing a polling token buffer at a base station.

FIG. 4 illustrates a method 400 for managing the polling token buffer 316. The base station 304 may implement the depicted method 400. For example, the processor 302 of the base station 304 may execute the polling buffer management instructions 322 that are stored in the memory 306 of the base station 304 to implement the depicted method 400.

A polling timer 318 may be set 402 for active connections 320 that are maintained by the base station 304. There may be one polling timer 318 that is set 402 for each active connection 320 of scheduling type 324 ertPS (extended real-time polling service), rtPS (real-time polling service), nrtPS (non-real-time polling service), and BE (best effort).

Each polling timer 318 may be associated with a timeout value, which indicates the duration of the polling timer 318. The timeout values for the polling timers 318 may be set as follows. For connections 320 of scheduling type 324 rtPS, a value depending on the service class name may be configured by the carrier (i.e., the entity that is responsible for maintaining the wireless communication network 100, including configuring the base station 304). Examples of service class names include 64-kbps Video Streaming, H.323 VoIP, etc. Alternatively, the timeout value may be set to the unsolicited polling interval of the QoS parameter.

For connections 320 of scheduling type 324 ertPS, a value depending on the service class name may be configured by the carrier. Alternatively, the timeout value may be set to the unsolicited polling interval of the QoS parameter.

For connections 320 of scheduling type 324 nrtPS, a value depending on the service class name may be configured by the carrier. Similarly, for connections 320 of scheduling type 324 BE, a value depending on the service class name may be configured by the carrier.

The polling timers 318 may be monitored 404. If it is determined 406 that a polling timer 318 has expired, it may be determined 408 whether a polling token 314 is already present in the polling token buffer 316 for the same connection 320. If not, then a polling token 314 may be generated 410 for the connection 320 corresponding to the expired timer 318. The polling token 314 may be stored 412 in the buffer 316.

In the method 400 of FIG. 4, the polling tokens 314 are generated at various time intervals (i.e., a polling token 314 is generated when a polling timer 318 expires). The timeout values of the polling timers 318 may be changed. Thus, the polling tokens 314 are generated at configurable time intervals.

The polling token 314 may be assigned 413 a priority that corresponds to the scheduling type 324 of the corresponding connection 320. For example, if the base station 304 is configured for a WiMAX network, the priority may be defined as ertPS (extended real-time polling service) or rtPS (real-time polling service) >nrtPS (non-real-time polling service) >BE (best effort). When the polling token 314 for the connection 320 is added to the buffer 316, the expired polling timer 318 corresponding to the connection 320 may be reset 414.

In addition, in accordance with the depicted method 400, the received bandwidth requests 208 may be monitored 404. When it is determined 416 that a bandwidth request 208 has been received for a particular connection 320, the polling timer 318 corresponding to that connection 320 may be reset 418.

In addition, in accordance with the depicted method 400, the received data 216 may be monitored 404. When data 216 is received for a connection 320 of scheduling type 324 UGS (unsolicited grant service), it may be determined 420 whether a bit that is referred to as the "poll-me bit" is set. If the poll-me bit is set, then a polling token 314 may be generated 424 for the subscriber station 306. The polling token 314 may be stored 426 in the polling token buffer 316. The polling token 314 may be assigned the highest priority (excluding UGS) of the UL connections 320 of the subscriber station 206 sending data in the polling token buffer 316.

Figure 4A:
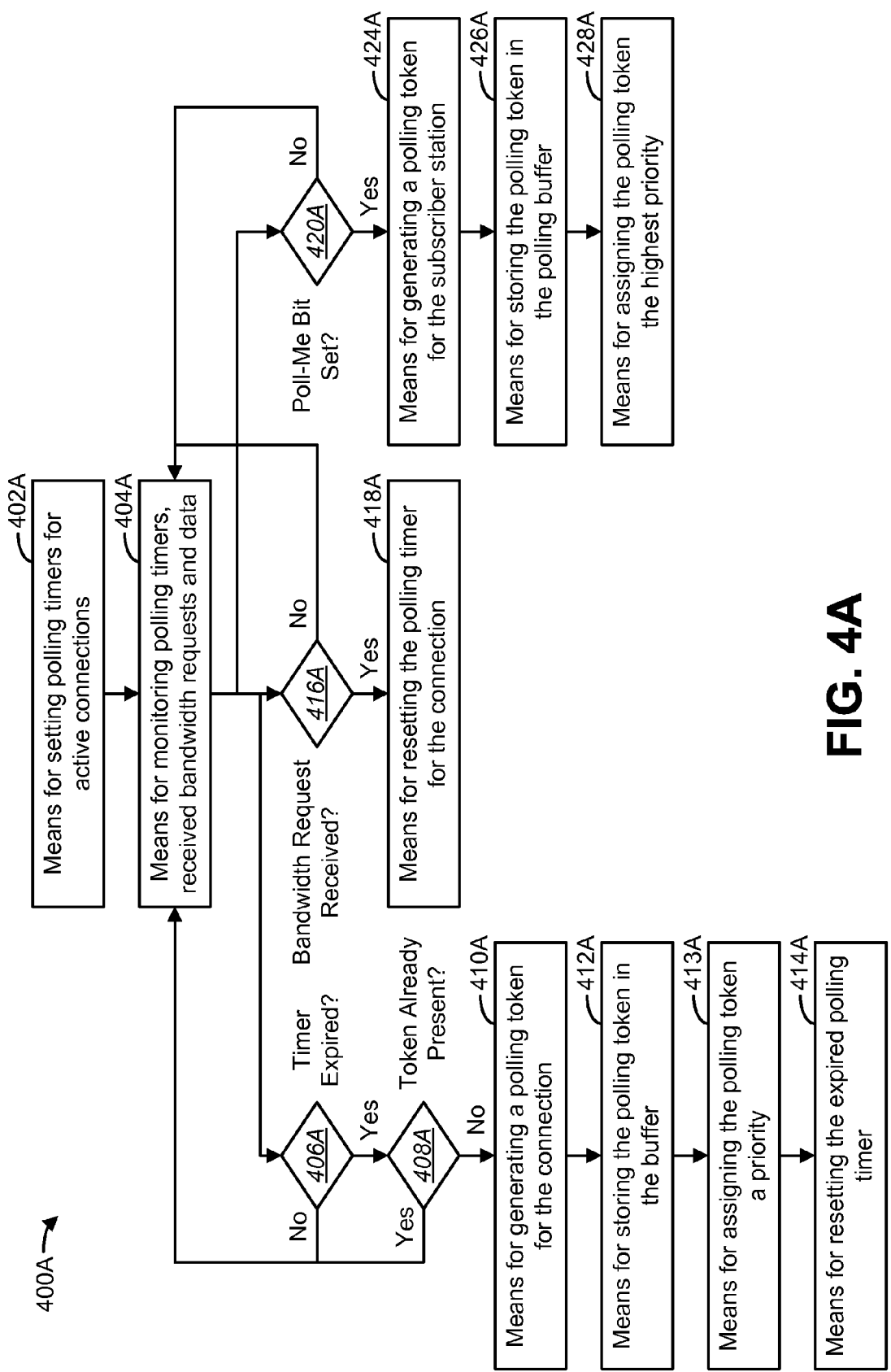
FIG. 4A illustrates means-plus-function blocks corresponding to the method shown in FIG. 4.

The method 400 of FIG. 4 described above may be performed by various hardware and/or software component(s) and/or module(s) corresponding to the means-plus-function blocks 400A illustrated in FIG. 4A. In other words, blocks 402 through 428 illustrated in FIG. 4 correspond to means-plus-function blocks 402A through 428A illustrated in FIG. 4A.

Figure 5:
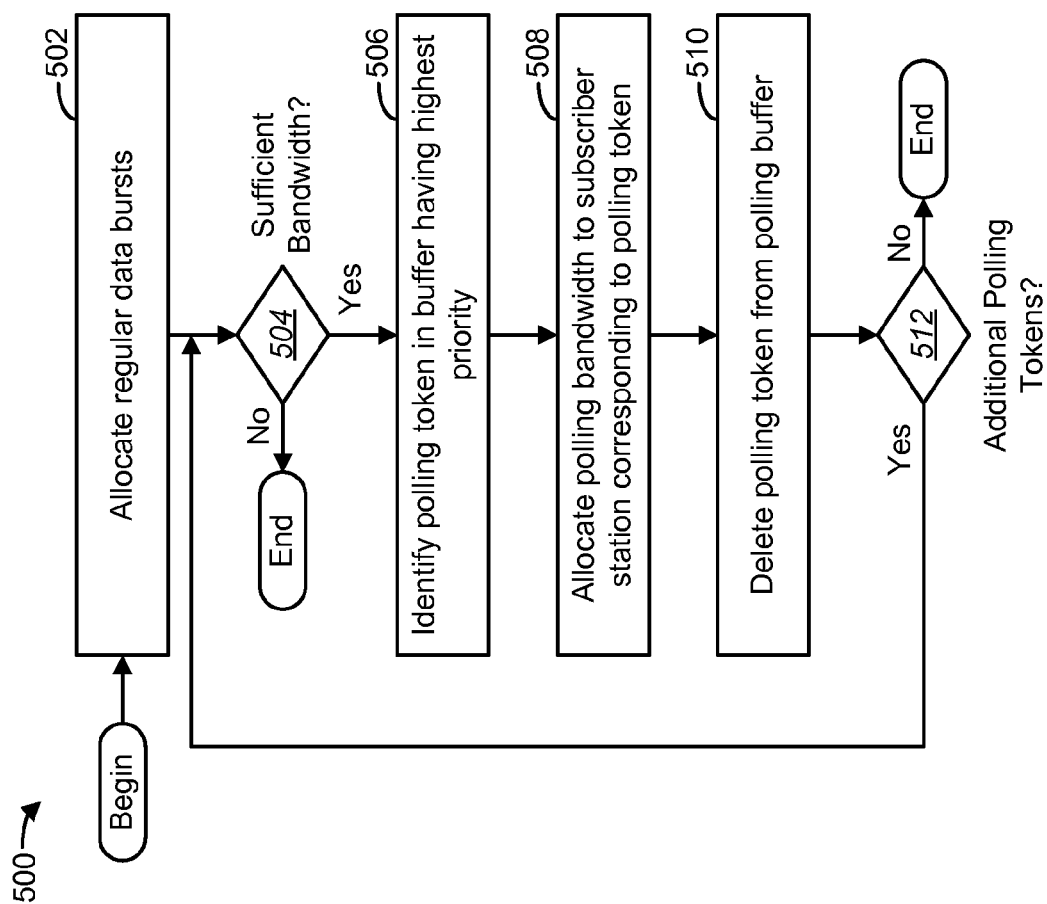
FIG. 5 illustrates a method for allocating polling bandwidth based on quality of service requirements.

FIG. 5 illustrates a method 500 for allocating polling bandwidth based on quality of service requirements. The base station 304 may implement the depicted method 500. For example, the processor 302 of the base station 304 may execute the polling bandwidth allocation instructions 312 that are stored in the memory 306 of the base station 304 to implement the depicted method 500. The method 500 may be implemented when the base station 304 is determining the UL-MAP for a particular uplink frame.

Initially, bandwidth for the regular data bursts may be allocated 502. Then it may be determined 504 whether there is sufficient uplink bandwidth remaining for allocating polling bandwidth. If there is sufficient bandwidth remaining, then the polling token 314 in the polling token buffer 316 that has the highest priority may be identified 506. Polling bandwidth may be allocated 508 to the subscriber station 206 that corresponds to the highest priority polling token 314. The polling token 314 may then be deleted 510 from the polling token buffer 316.

If it is determined 512 that there are additional polling tokens 314 in the polling token buffer 316, the method 500 may return to determining 504 whether there is sufficient uplink bandwidth remaining for allocating polling bandwidth. The method 500 may then continue in the manner described above.

In the method 500 shown in FIG. 5, bandwidth for the regular data bursts is allocated before the polling bandwidth is allocated. Alternatively, the polling bandwidth may be allocated first, and then bandwidth for regular data bursts may be allocated thereafter.

Figure 5A:
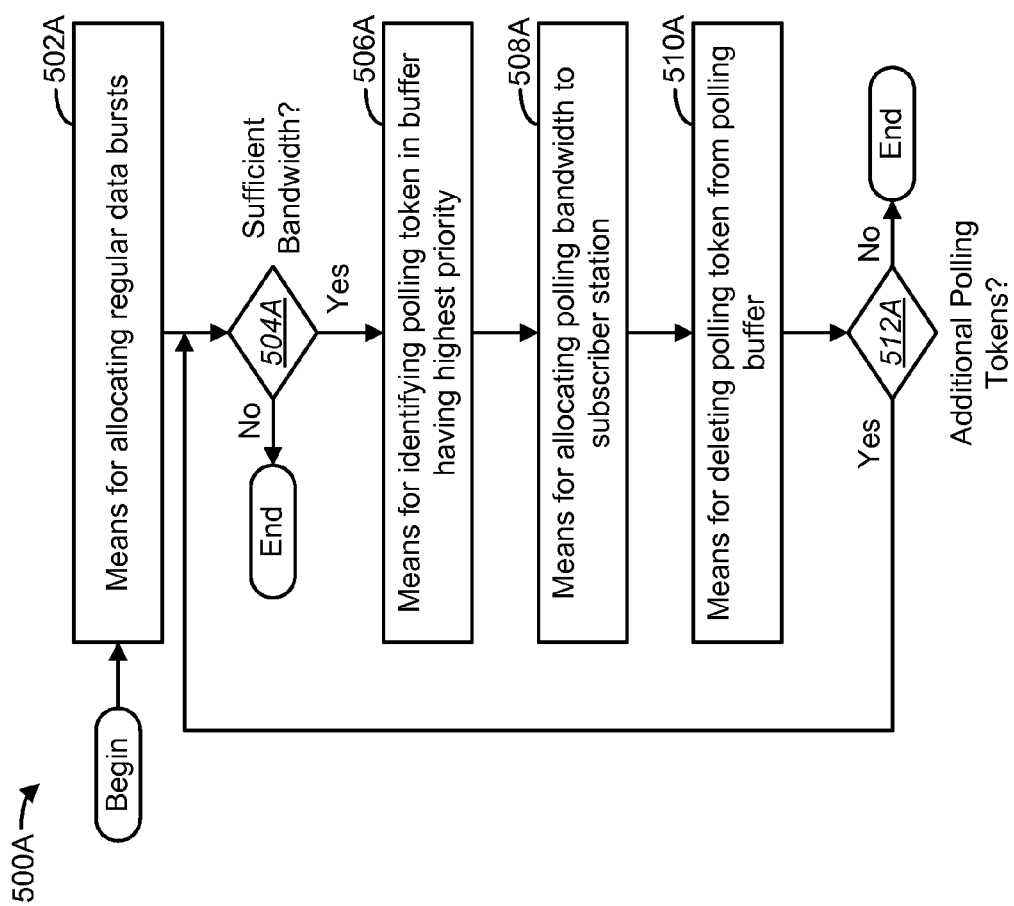
FIG. 5A illustrates means-plus-function blocks corresponding to the method shown in FIG. 5.

The method 500 of FIG. 5 described above may be performed by various hardware and/or software component(s) and/or module(s) corresponding to the means-plus-function blocks 500A illustrated in FIG. 5A. In other words, blocks 502 through 512 illustrated in FIG. 5 correspond to means-plus-function blocks 502A through 512A illustrated in FIG. 5A.

Figure 6:
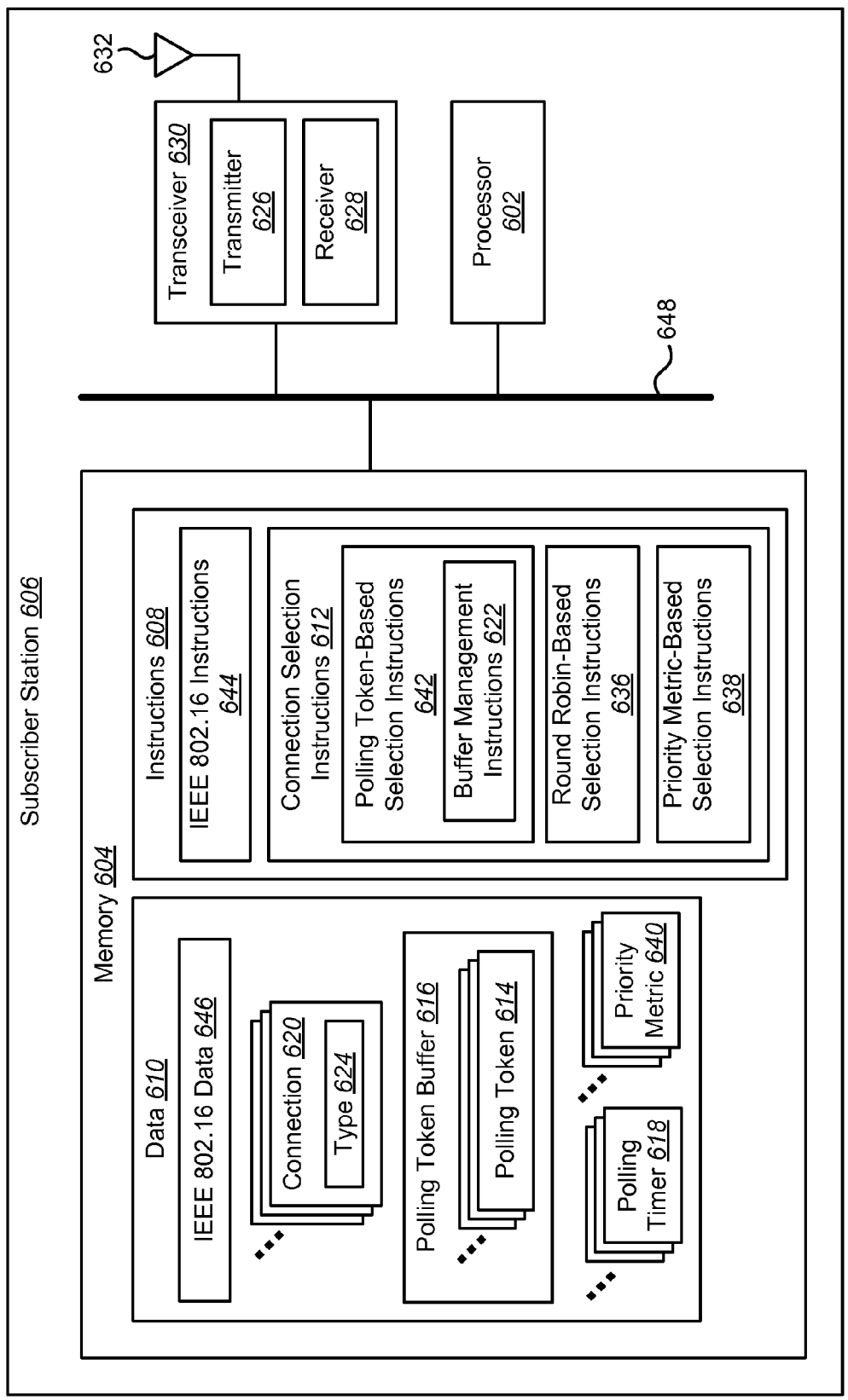
FIG. 6 illustrates a subscriber station that is configured to select connections for which bandwidth requests are transmitted based on quality of service requirements.

FIG. 6 illustrates a subscriber station 606. The subscriber station 606 may be configured to select the connections for which bandwidth requests 208 are transmitted based on quality of service requirements.

The subscriber station 606 includes a processor 602 and memory 604. The processor 602 may be a general purpose single- or multi-chip microprocessor (e.g., an ARM), a special purpose microprocessor (e.g., a digital signal processor (DSP)), a microcontroller, a programmable gate array, etc. The processor 602 may also be referred to as a central processing unit (CPU). Although just a single processor 602 is shown in the subscriber station 606 of FIG. 6, in an alternative configuration, a combination of processors 602 (e.g., an ARM and DSP) could be used.

The subscriber station 606 also includes a memory 604. The memory 604 may be any electronic component capable of storing electronic information. The memory 604 may be embodied as random access memory (RAM), read only memory (ROM), magnetic disk storage media, optical storage media, flash memory devices in RAM, on-board memory included with the processor 602, EPROM memory, EEPROM memory, registers, and so forth, including combinations thereof.

Instructions 608 and data 610 may be stored in the memory 604. The instructions 608 may be executable by the processor 602 to implement various functions, which will be described below. Executing the instructions 608 may involve the use of the data 610 that is stored in the memory 604.

The subscriber station 606 may also include a transmitter 626 and a receiver 628 to allow transmission and reception of data between the subscriber station 606 and base stations 104. The transmitter 626 and receiver 628 may be collectively referred to as a transceiver 630. An antenna 632 may be electrically coupled to the transceiver 630. The subscriber station 606 may also include (not shown) multiple transmitters, multiple receivers, multiple transceivers and/or multiple antenna.

The various components of the subscriber station 606 may be coupled together by one or more buses, which may include a power bus, a control signal bus, a status signal bus, a data bus, etc. For the sake of clarity, the various buses are illustrated in FIG. 6 as a bus system 648.

The subscriber station 606 may be configured to communicate via a wireless communication network that supports the IEEE 802.16 standard (i.e., WiMAX). The memory 604 may include instructions 644 and data 646 that facilitate communication in accordance with the IEEE 802.16 standard.

The data 610 in the memory 604 may include information about the active connections 620 that are currently maintained by the subscriber station 606. The information that is maintained about the connections 620 may include the scheduling types 624 of the various connections 620. For example, for a WiMAX network, the information about a particular connection 620 may include whether the connection 620 is of scheduling type 624 UGS, ertPS, rtPS, nrtPS, or BE.

The data 610 in the memory 604 may also include polling tokens 614, which may be stored in a polling token buffer 616. The data 610 may also include polling timers 618. There may be a separate polling timer 618 for each connection 620 that is maintained by the subscriber station 604. The polling tokens 614 and the polling timers 618 will be described in greater detail below.

Alternatively, or in addition, the data 610 in the memory 604 may include priority metrics 640 for the connections 620. The priority metrics 640 will be described in greater detail below.

The instructions 608 in the memory 604 may include instructions 612 for selecting the connections 620 for which bandwidth requests 208 are transmitted. The connection selection instructions 612 may include instructions 642 for using polling tokens 614 to select the connections 620 for which bandwidth requests 208 are transmitted. The polling token-based selection instructions 642 may include instructions 622 for managing the polling token buffer 616.

Alternatively, or in addition, the connection selection instructions 612 may include instructions 636 for selecting connections 620 in accordance with a round robin algorithm. Alternatively, or in addition, the connection selection instructions 612 may include instructions 638 for selecting connections 620 based on the priority metrics 640 that are calculated.

Figure 7:
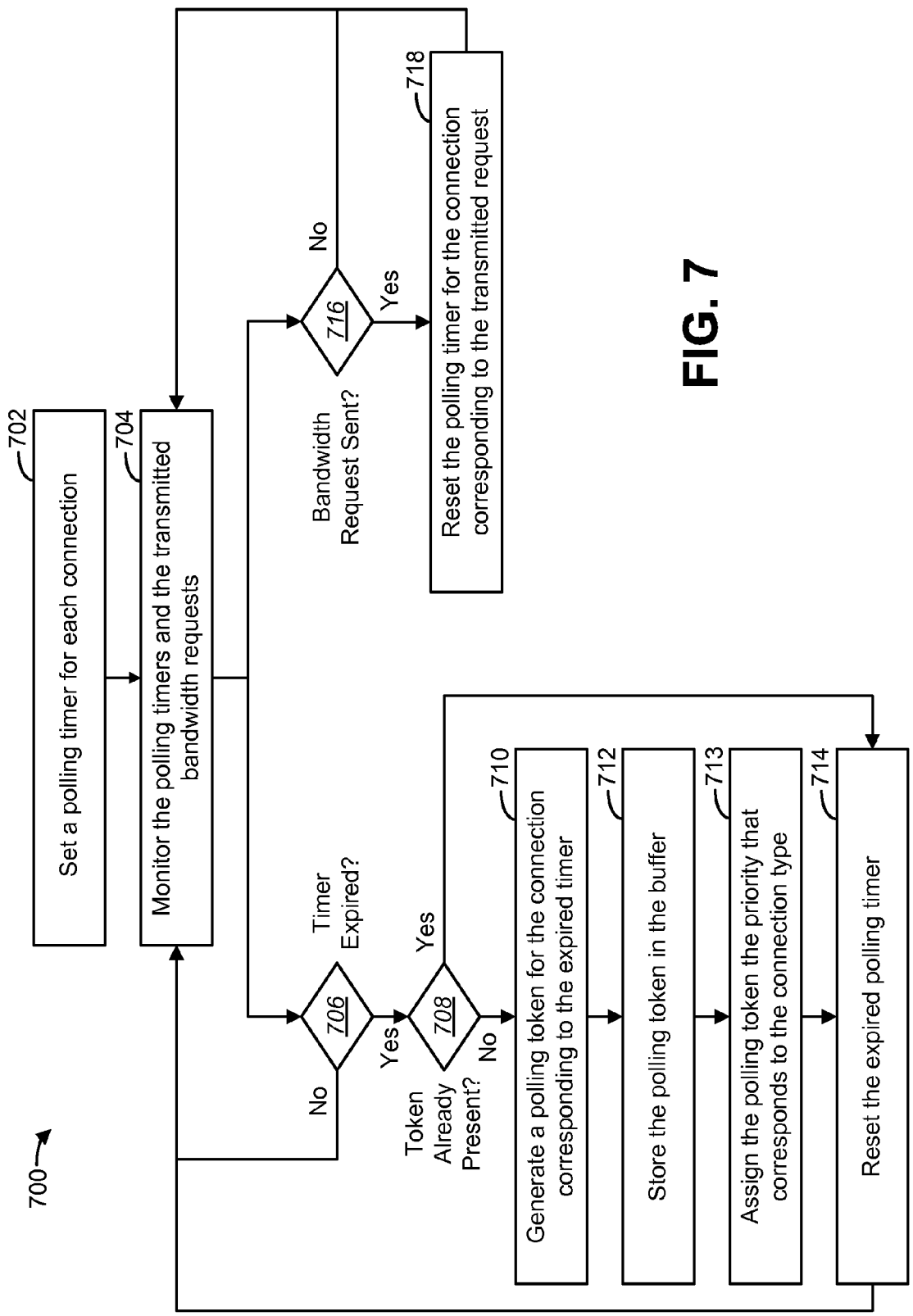
FIG. 7 illustrates a method for managing a polling token buffer at a subscriber station.

FIG. 7 illustrates a method 700 for managing the polling token buffer 616. The subscriber station 606 may implement the depicted method 700. For example, the processor 602 of the subscriber station 606 may execute the polling buffer management instructions 622 that are stored in the memory 604 of the subscriber station 606 to implement the depicted method 700.

A polling timer 618 may be set 702 for each active connection 620 that is maintained by the subscriber station 606. There may be one polling timer 618 that is set 702 for each active connection 620 of scheduling type 624 ertPS (extended real-time polling service), rtPS (real-time polling service), nrtPS (non-real-time polling service), and BE (best effort).

Each polling timer 618 may be associated with a timeout value, which indicates the duration of the polling timer 618. The timeout values for the polling timers 618 in the subscriber station 606 may be set in a similar manner to the way in which the timeout values are set for the polling timers 318 in the base station 304, as described above.

The polling timers 618 may be monitored 704. If it is determined 706 that a polling timer 618 has expired, it may be determined 708 whether a polling token 614 is already present in the polling token buffer 616 for the same connection 620. If not, then a polling token 614 may be generated 710 for the connection 620 corresponding to the expired timer 618. The polling token 614 may be stored 712 in the buffer 616.

In the method 700 of FIG. 7, the polling tokens 614 are generated at various time intervals (i.e., a polling token 614 is generated when a polling timer 618 expires). The timeout values of the polling timers 618 may be changed. Thus, the polling tokens 614 are generated at configurable time intervals.

The polling token 614 may be assigned 713 a priority that corresponds to the scheduling type 624 of the corresponding connection 620. For example, if the subscriber station 606 is configured for a WiMAX network, the priority may be defined as ertPS (extended real-time polling service) or rtPS (real-time polling service) >nrtPS (non-real-time polling service) >BE (best effort). When the polling token 614 for the connection 620 is added to the buffer 616, the expired polling timer 618 corresponding to the connection 620 may be reset 714.

In addition, in accordance with the depicted method 700, the transmitted bandwidth requests 208 may be monitored 704. When it is determined 716 that a bandwidth request 208 has been transmitted for a particular connection 620, the polling timer 618 corresponding to that connection 620 may be reset 718.

Figure 7A:
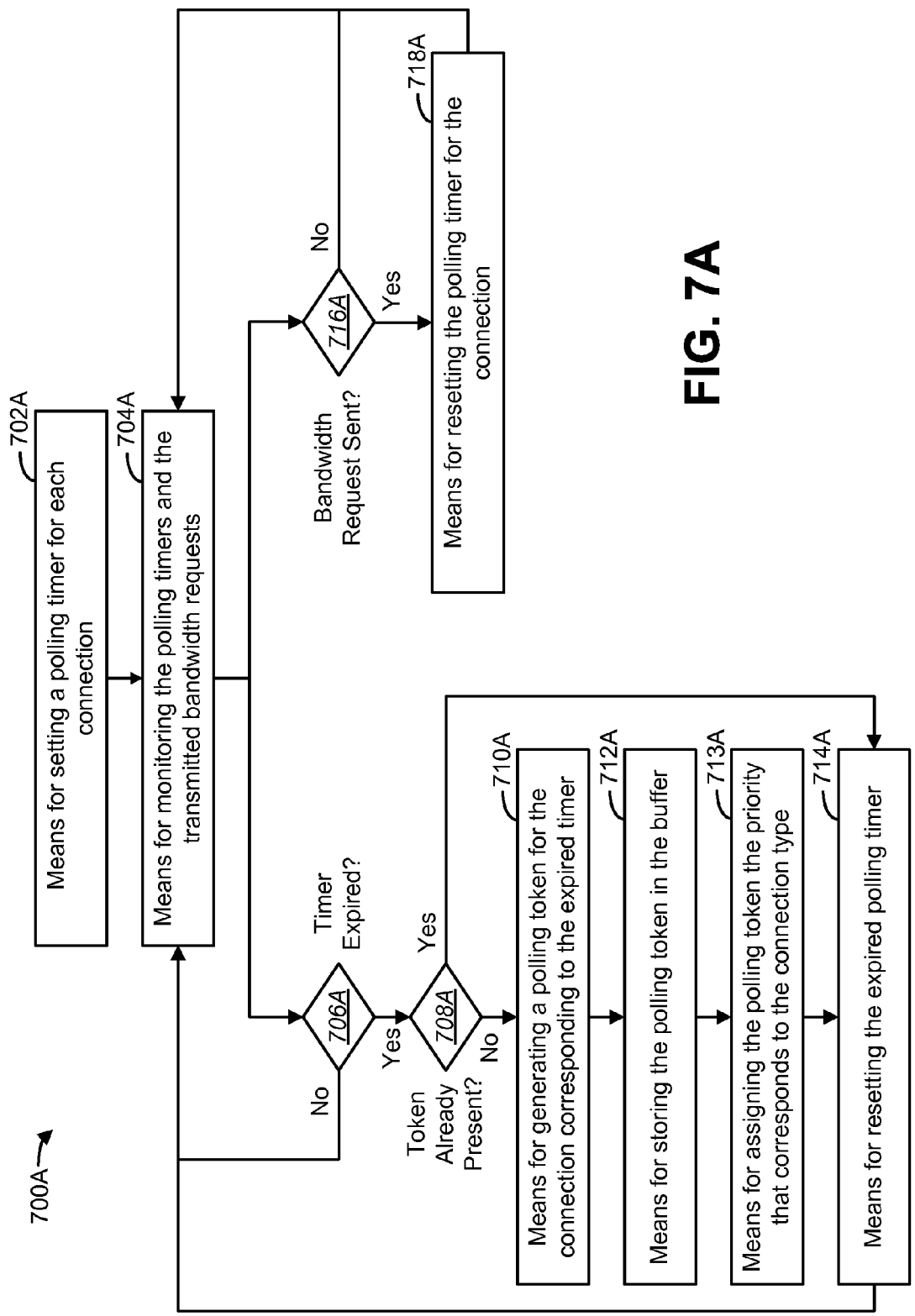
FIG. 7A illustrates means-plus-function blocks corresponding to the method shown in FIG. 7.

The method 700 of FIG. 7 described above may be performed by various hardware and/or software component(s) and/or module(s) corresponding to the means-plus-function blocks 700A illustrated in FIG. 7A. In other words, blocks 702 through 718 illustrated in FIG. 7 correspond to means-plus-function blocks 702A through 718A illustrated in FIG. 7A.

Figure 8:
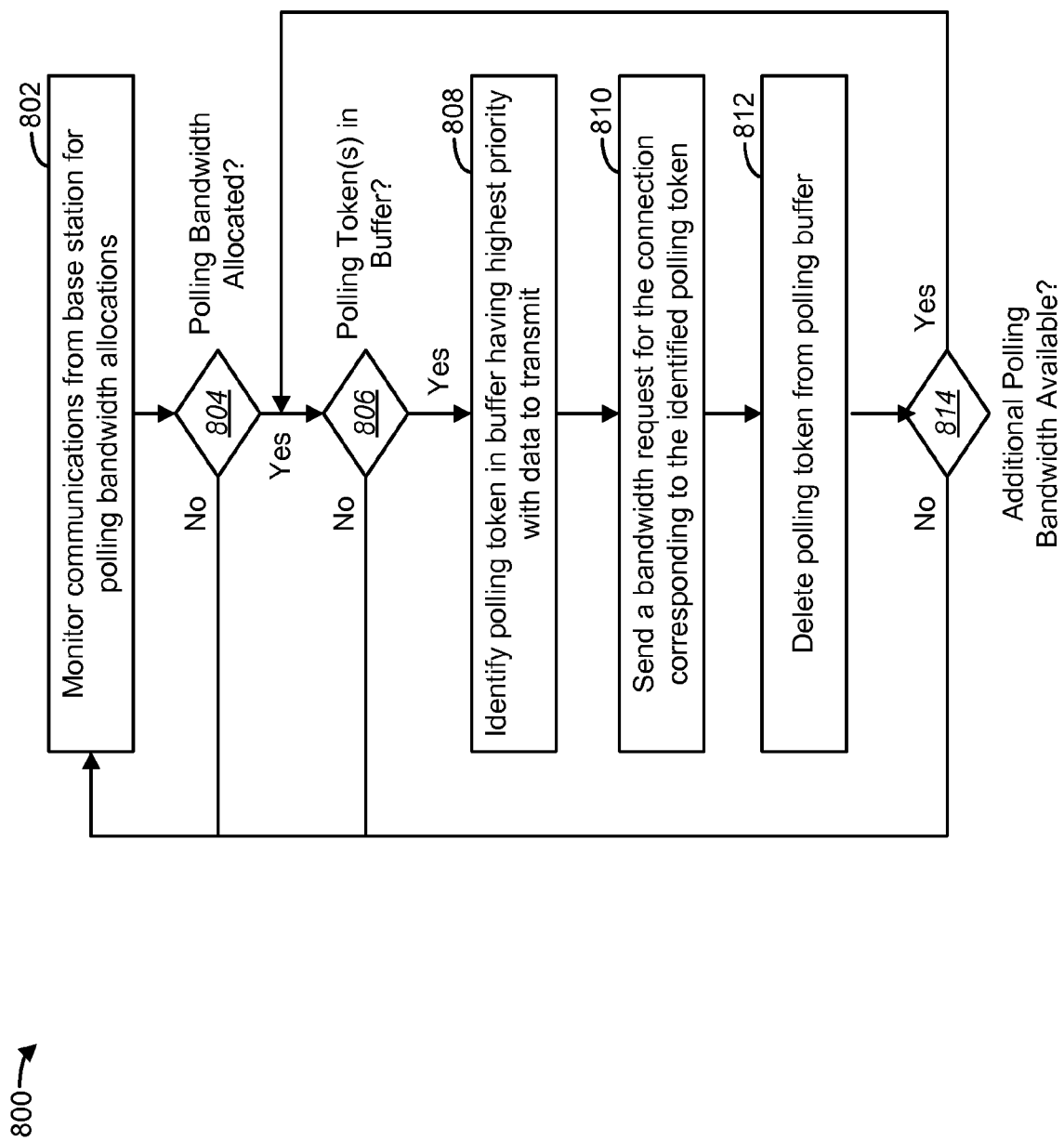
FIG. 8 illustrates a method for selecting the connections for which bandwidth requests are transmitted based on quality of service requirements.

FIG. 8 illustrates a method 800 for selecting the connections 620 for which bandwidth requests 208 are transmitted based on quality of service requirements. The subscriber station 606 may implement the depicted method 800. For example, the processor 602 of the subscriber station 606 may execute the connection selection instructions 612 that are stored in the memory 604 of the subscriber station 606 to implement the depicted method 800.

Communications that are received from the base station 104 may be monitored 802 for polling bandwidth allocations 210. The base station 104 may provide a polling bandwidth allocation 210 to the subscriber station 606 by indicating the basic connection identifier (CID) of the subscriber station 606 in the UL-MAP.

If it is determined 804 that polling bandwidth has been allocated, then it may be determined 806 whether there are polling tokens 614 in the polling token buffer 616. If there is at least one polling token 614 in the polling token buffer 616, then the polling token 614 that has the highest priority and that has data to transmit may be identified 808. A bandwidth request 208 may then be transmitted 810 for the connection 620 corresponding to the identified polling token 614, and the polling token 614 may be deleted 812 from the polling buffer 616.

It may then be determined 814 whether there is additional polling bandwidth available. If there is, then the method 800 may return to determining whether there is at least one polling token 614 in the polling token buffer 616. The method 800 may then continue in the manner described above.

As an alternative to the depicted method 800, the connections 620 for which bandwidth requests 208 are transmitted may be selected based on priority metrics 640 that may be calculated for the various connections 620. The priority metric 640 for a particular connection 620 may be determined as: the number of bytes buffered of the connection 620 multiplied by a factor depending on the scheduling type 624 and/or the service class name. In this example, the higher the value of the priority metric 640, the higher the priority is for the subscriber station 606 to send a bandwidth request 208 for the connection 620.

As another alternative to the depicted method 800, the connections 620 for which bandwidth requests 208 are transmitted may be selected in accordance with a round robin algorithm. Bandwidth requests 208 may be transmitted in this manner until the allocated polling bandwidth is used up.

Figure 8A:
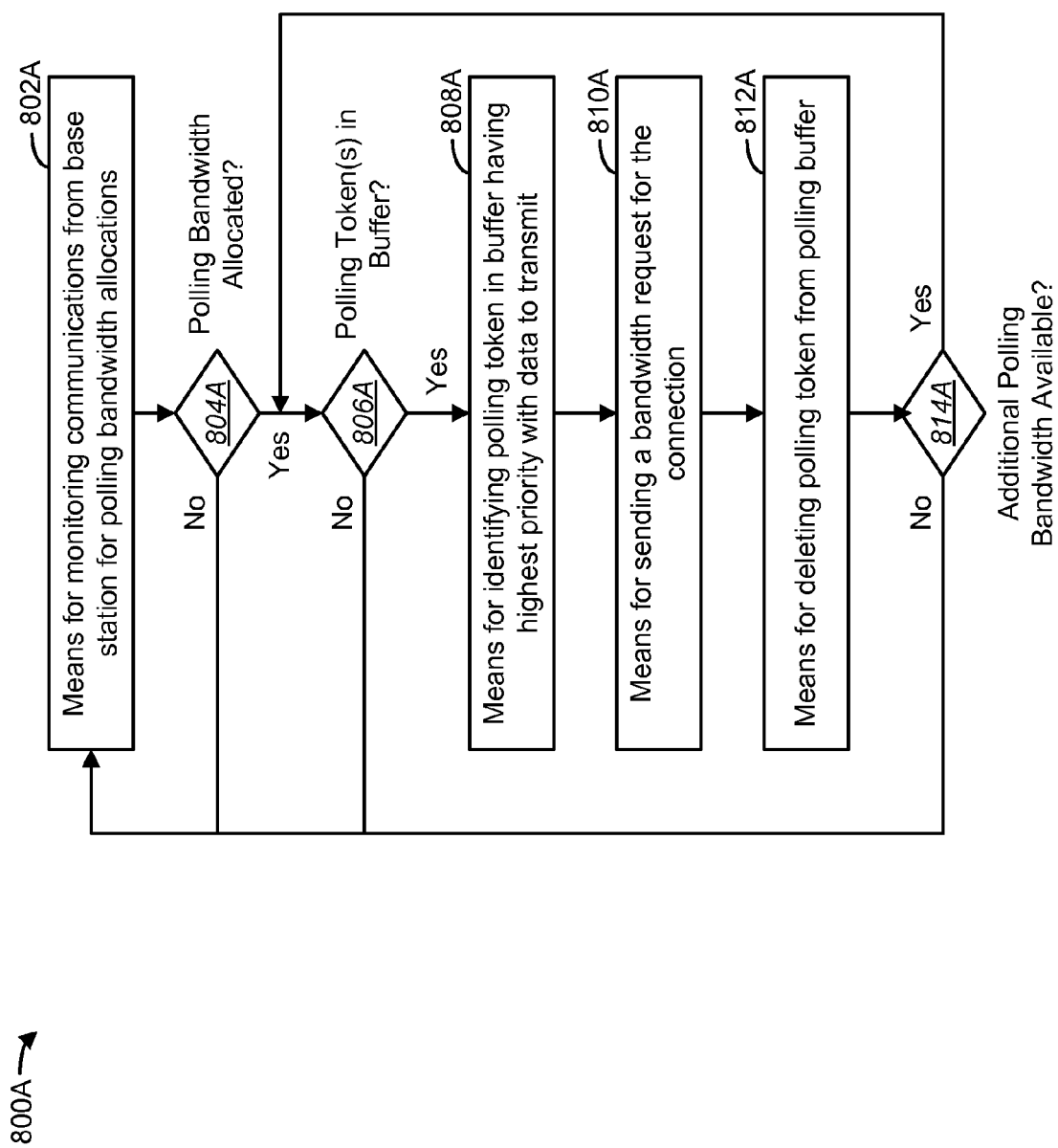
FIG. 8A illustrates means-plus-function blocks corresponding to the method shown in FIG. 8.

The method 800 of FIG. 8 described above may be performed by various hardware and/or software component(s) and/or module(s) corresponding to the means-plus-function blocks 800A illustrated in FIG. 8A. In other words, blocks 802 through 814 illustrated in FIG. 8 correspond to means-plus-function blocks 802A through 814A illustrated in FIG. 8A.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

As used herein, the terms "code" and "instructions" should be interpreted broadly to include any type of computer-readable statement(s). For example, the terms "code" and "instructions" may refer to one or more programs, routines, sub-routines, functions, procedures, etc.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored instructions or as one or more sets of instructions on a computer-readable medium or storage medium. A computer-readable medium may be any available medium that can be accessed by a computer or as one or more processing devices. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIGS. 4-5 and 7-8, can be downloaded and/or otherwise obtained by a subscriber station and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a subscriber station and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A base station that is configured for allocating polling bandwidth based on quality of service requirements, comprising:
   a processor;
   a memory in electronic communication with the processor;
   instructions stored in the memory, the instructions being executable to:
   generate polling tokens corresponding to connections maintained by the base station, wherein the polling tokens are generated at configurable time intervals;
   assign priorities to the polling tokens, wherein the priority of a polling token depends on a scheduling type of a corresponding connection; and
   allocate polling bandwidth to the connections that correspond to the highest priority polling tokens when uplink bandwidth is available to allocate for polling.

2. The base station of claim 1, wherein the instructions are also executable to set polling timers for the connections maintained by the base station, and wherein the polling tokens are generated when the polling timers expire.

3. The base station of claim 1, wherein the instructions are also executable to:
   receive a bandwidth request; and
   reset a polling timer corresponding to the received bandwidth request.

4. The base station of claim 1, wherein the priorities for the polling tokens are set according to the following hierarchy for the scheduling types: ertPS (extended real-time polling service) or rtPS (real-time polling service) >nrtPS (non-real-time polling service) >BE (best effort).

5. The base station of claim 1, wherein the base station is configured to communicate via a wireless communication network that supports an Institute of Electronic and Electrical Engineers (IEEE) 802.16 standard.

6. A subscriber station that is configured for selecting connections for which bandwidth requests are transmitted based on quality of service requirements, comprising:
   a processor;
   a memory in electronic communication with the processor;
   instructions stored in the memory, the instructions being executable to:
   receive a polling bandwidth allocation from a base station;
   select one or more connections maintained by the subscriber station for which one or more bandwidth requests are to be transmitted to the base station at least in part by:
   generating polling tokens corresponding to the one or more connections at configurable time intervals;
   assigning priorities to the polling tokens depending on a scheduling type of a corresponding connection; and
   selecting the one or more connections corresponding to one or more of the polling tokens with a highest priority; and
   transmit the one or more bandwidth requests to the base station within the polling bandwidth allocation for the selected one or more connections.

7. The subscriber station of claim 6, wherein the one or more connections are selected in accordance with a round robin algorithm.

8. The subscriber station of claim 6, wherein selecting the one or more connections comprises determining metrics for the connections, at least one metric for at least one of the one or more connections comprises a number of bytes buffered of the at least one connection multiplied by a factor depending on at least one of a scheduling type and a service class name.

9. The subscriber station of claim 6, wherein the subscriber station is configured to communicate via a wireless communication network that supports an Institute of Electronic and Electrical Engineers (IEEE) 802.16 standard.

10. A method for allocating polling bandwidth based on quality of service requirements, the method being implemented by a base station, the method comprising:
    generating polling tokens corresponding to connections maintained by the base station, wherein the polling tokens are generated at configurable time intervals;
    assigning priorities to the polling tokens, wherein the priority of a polling token depends on a scheduling type of a corresponding connection; and
    allocating polling bandwidth to the connections that correspond to the highest priority polling tokens when uplink bandwidth is available to allocate for polling.

11. The method of claim 10, further comprising setting polling timers for the connections maintained by the base station, wherein the polling tokens are generated when the polling timers expire.

12. The method of claim 10, further comprising:
    receiving a bandwidth request; and
    resetting a polling timer corresponding to the received bandwidth request.

13. The method of claim 10, wherein the priorities for the polling tokens are set according to the following hierarchy for the scheduling types: ertPS (extended real-time polling service) or rtPS (real-time polling service) >nrtPS (non-real-time polling service) >BE (best effort).

14. The method of claim 10, wherein the base station is configured to communicate via a wireless communication network that supports an Institute of Electronic and Electrical Engineers (IEEE) 802.16 standard.

15. A method for selecting connections for which bandwidth requests are transmitted based on quality of service requirements, the method being implemented by a subscriber station, the method comprising:
receiving a polling bandwidth allocation from a base station;
selecting one or more connections maintained by the subscriber station for which one or more bandwidth requests are to be transmitted to the base station at least in part by:
generating polling tokens corresponding to the one or more connections at configurable time intervals;
assigning priorities to the polling tokens depending on a scheduling type of a corresponding connection; and
selecting the one or more connections corresponding to one or more of the polling tokens with a highest priority; and
transmitting the one or more bandwidth requests to the base station within the polling bandwidth allocation for the selected one or more connections.

16. The method of claim 15, wherein the one or more connections are selected in accordance with a round robin algorithm.

17. The method of claim 15, wherein selecting the one or more connections comprises determining metrics for the connections, at least one metric for at least one of the one or more connections comprises a number of bytes buffered of the at least one connection multiplied by a factor depending on at least one of a scheduling type and a service class name.

18. The method of claim 15, wherein the subscriber station is configured to communicate via a wireless communication network that supports an Institute of Electronic and Electrical Engineers (IEEE) 802.16 standard.

19. A base station that is configured for allocating polling bandwidth based on quality of service requirements, comprising:
means for generating polling tokens corresponding to connections maintained by the base station, wherein the polling tokens are generated at configurable time intervals;
means for assigning priorities to the polling tokens, wherein the priority of a polling token depends on a scheduling type of a corresponding connection; and
means for allocating polling bandwidth to the connections that correspond to the highest priority polling tokens when uplink bandwidth is available to allocate for polling.

20. The base station of claim 19, further comprising means for setting polling timers for the connections maintained by the base station, wherein the polling tokens are generated when the polling timers expire.

21. The base station of claim 19, further comprising:
means for receiving a bandwidth request; and
means for resetting a polling timer corresponding to the received bandwidth request.

22. The base station of claim 19, wherein the priorities for the polling tokens are set according to the following hierarchy for the scheduling types: ertPS (extended real-time polling service) or rtPS (real-time polling service) >nrtPS (non-real-time polling service) >BE (best effort).

23. The base station of claim 19, wherein the base station is configured to communicate via a wireless communication network that supports an Institute of Electronic and Electrical Engineers (IEEE) 802.16 standard.

24. A subscriber station that is configured for selecting connections for which bandwidth requests are transmitted based on quality of service requirements, comprising:
means for receiving a polling bandwidth allocation from a base station;
means for selecting one or more connections maintained by the subscriber station for which one or more bandwidth requests are to be transmitted to the base station at least in part by:
generating polling tokens corresponding to the one or more connections at configurable time intervals;
assigning priorities to the polling tokens depending on a scheduling type of a corresponding connection; and
selecting the one or more connections corresponding to one or more of the polling tokens with a highest priority; and
means for transmitting the one or more bandwidth requests to the base station within the polling bandwidth allocation for the selected one or more connections.

25. The subscriber station of claim 24, wherein the one or more connections are selected in accordance with a round robin algorithm.

26. The subscriber station of claim 24, wherein the means for selecting the one or more connections comprises means for determining metrics for the connections, at least one metric for at least one of the one or more connections comprises a number of bytes buffered of the at least one connection multiplied by a factor depending on at least one of a scheduling type and a service class name.

27. The subscriber station of claim 24, wherein the subscriber station is configured to communicate via a wireless communication network that supports an Institute of Electronic and Electrical Engineers (IEEE) 802.16 standard.

28. A computer-program product for allocating polling bandwidth based on quality of service requirements, the computer-program product comprising a non-transitory computer readable medium having instructions thereon, the instructions comprising:
code for generating polling tokens corresponding to connections maintained by the base station, wherein the polling tokens are generated at configurable time intervals;
code for assigning priorities to the polling tokens, wherein the priority of a polling token depends on a scheduling type of a corresponding connection; and
code for allocating polling bandwidth to the connections that correspond to the highest priority polling tokens when uplink bandwidth is available to allocate for polling.

29. The computer-program product of claim 28, further comprising code for setting polling timers for the connections maintained by the base station, wherein the polling tokens are generated when the polling timers expire.

30. The computer-program product of claim 28, further comprising:
code for receiving a bandwidth request; and
code for resetting a polling timer corresponding to the received bandwidth request.

31. The computer-program product of claim 28, wherein the priorities for the polling tokens are set according to the following hierarchy for the scheduling types: ertPS (extended real-time polling service) or rtPS (real-time polling service) >nrtPS (non-real-time polling service) >BE (best effort).

32. The computer-program product of claim 28, wherein the computer-program product is part of a base station, and wherein the base station is configured to communicate via a wireless communication network that supports an Institute of Electronic and Electrical Engineers (IEEE) 802.16 standard.

33. A computer-program product for selecting connections for which bandwidth requests are transmitted based on quality of service requirements, the computer-program product comprising a non-transitory computer readable medium having instructions thereon, the instructions comprising:
- code for receiving a polling bandwidth allocation from a base station;
- code for selecting one or more connections maintained by the subscriber station for which one or more bandwidth requests are to be transmitted to the base station at least in part by:
  - generating polling tokens corresponding to the one or more connections at configurable time intervals;
  - assigning priorities to the polling tokens depending on a scheduling type of a corresponding connection; and
  - selecting the one or more connections corresponding to one or more of the polling tokens with a highest priority; and
- code for transmitting the one or more bandwidth requests to the base station within the polling bandwidth allocation for the selected one or more connections.

34. The computer-program product of claim 33, wherein the one or more connections are selected in accordance with a round robin algorithm.

35. The computer-program product of claim 33, wherein the code for selecting the one or more connections comprises code for determining metrics for the connections, at least one metric for at least one of the one or more connections comprises a number of bytes buffered of the at least one connection multiplied by a factor depending on at least one of a scheduling type and a service class name.

36. The computer-program product of claim 33, wherein the computer-program product is part of a subscriber station, and wherein the subscriber station is configured to communicate via a wireless communication network that supports an Institute of Electronic and Electrical Engineers (IEEE) 802.16 standard.

* * * * *